United States Patent Office 3,796,644
Patented Mar. 12, 1974

3,796,644
ELECTROLYTIC FORMATION PROCESS FOR ALUMINUM CAPACITOR ELECTRODES
Walter J. Bernard, Williamstown, Mass., assignor to Sprague Electric Company, North Adams, Mass.
No Drawing. Filed May 3, 1972, Ser. No. 249,808
Int. Cl. C23b 9/02
U.S. Cl. 204—58                                     4 Claims

ABSTRACT OF THE DISCLOSURE

An aluminum capacitor electrode has a partially crystalline anodic oxide structure formed thereon that is hydration-resistant, and possesses a stable capacitance value, dissipation factor and leakage current even under high humidity conditions. This hydration-resistant oxide structure is advantageously formed when an aluminum electrode is treated in a formation electrolyte at a temperature in excess of 150° C. The electrolyte may be any suitable solvent/solute system wherein the solvent is a high boiling organic material containing a small percentage of water and the solute is a salt having a concentration that imparts a conductivity of 10,000 ohm-cm. or less to the electrolyte.

BACKGROUND OF THE INVENTION

This invention relates to a formation process for aluminum capacitor electrodes, and more particularly to a high temperature formation process that produces a hydration-resistant oxide film on aluminum capacitor electrodes.

For years, aluminum oxide films have been formed for a variety of purposes in the electronics art. Most of these oxide films have been formed on foil or porous bodies for use in capacitors. One of the most serious defects in aluminum capacitors is the deterioration of their electrical properties under high humidity conditions. Anodic aluminum oxide is well known to adsorb and react with water, and it is assumed that these reactions are at least partially responsible for the observed changes in capacitance, dissipation factor and leakage current.

Prior art attempts to overcome this problem have included the use of hermetic seals with aluminum capacitors. However, this is costly and can be a somewhat tedious operation. Different prior art electrolytes have been used to impart some hydration resistance to aluminum oxide films, however these solutions have not always been entirely satisfactory.

Existence of a non-hydratable polymorph of alumina ($\alpha$-alumina) has been known in the art for many years. But because of difficulties inherent in its anodic formation alpha-alumina was deemed impracticable as a capacitor dielectric. Through the concept of the present invention it is possible to make capacitors having excellent electrical characteristics with a substantially hydration-resistant dielectric oxide film therein.

It is an object of this invention to provide a reliable and economical formation process for producing aluminum anode electrodes that possess excellent electrical characteristics.

It is another object of the present invention to provide substantially hydration-resistant aluminum electrodes for capacitor usage.

Further objects of the invention as well as the advantages of it will become apparent from this specification as well as the appended claims.

SUMMARY OF THE INVENTION

A partially crystalline, hydration-resistant oxide structure is formed on an aluminum electrode when treated in a formation electrolyte at a temperature in excess of 150° C. The formation electrolyte may be any suitable solvent/solute system wherein the solvent is a high boiling organic material combined with water as a minor constituent, and the solute is a salt imparting a conductivity of 10,000 ohm-cm. or less to the solution. The most advantageous and stable oxide films are produced when the formation electrolyte has a relatively low viscosity. The barrier oxide layers formed thereon are stable, even under high humidity conditions.

Stability experiments made on films formed in electrolytes over a range of temperatures demonstrate that the higher the forming temperature, the greater the stability of the films produced thereby. The addition of from 0.1% to 1.0% ammonium dihydrogen phosphate to the solute imparts even greater protection to the films formed thereby.

DESCRIPTION OF THE PREFERRED EMBODIMENTS

The formation process of this invention produces a crystalline modification of alumina that is more resistant to water and water vapor than the amorphous form of alumina. This process is performed by treating an aluminum electrode in a liquid solvent/solute system at a temperature in excess of 150° C., wherein the solvent is a high boiling organic material combined with a small amount of water, and the solute is a salt imparting a conductivity of 10,000 ohm-cm. or less thereto. The higher the temperature of the formation bath, the greater the stability of the oxide films produced thereby. The electrode formed by this process can advantageously be used as the anode electrode in aluminum capacitors.

More particularly, the formation electrolyte should be composed of a small percentage of water, a major portion of an organic material having a boiling point in excess of 150° C., and a proportion of a solute having therein at least one member selected from the group consisting essentially of phosphates, borates, tartrates, citrates, lactates, acetates, benzoates and salicylates. Preferably, this electrolyte should have a relatively low viscosity at the formation temperature. If the liquid electrolyte were too viscous, porous aluminum bodies would not be given a uniform anodic oxide formation, and would, therefore, be susceptible to water vapor diffusion into the minutest recesses or the porous body which upon subsequent condensation, could give rise to high leakage current effects. The electrolyte chosen should have a rather wide liquid range, and preferably be liquid at room temperature.

Some organic materials that could be used as solvents for the electrolyte include ethylene glycol, N-methyl propionamide, dimethyl acetamide, dimethyl sulfoxide, isooctanol, glycerol, and other similar high boiling materials. It should be pointed out that "high boiling" means a boiling point in excess of 150° C. Water should always be used in conjunction with the electrolyte of this invention and may be present therein in amounts varying from 0.1% to 10%, depending on the final formation temperature of the process. The higher temperature being attainable by solutions having the lower water content. If more than 10% water is present, it is increasingly difficult for the temperature of the electrolyte to reach 150° C. or more.

The solute is a salt that imparts a conductivity of 10,000 ohm-cm. or less. Most preferably the solution chosen will have a conductivity of from 500–1,000 ohm-cm. The salt is at least one member selected from the group consisting essentially of phosphates, borates, tartrates, citrates, lactates, acetates, benzoates and salicylates.

A D.C. forming voltage of up to 200 v. can be employed for the purposes of this invention, and the forming operation is continued for approximately 10 minutes or until the resultant electrodes possess all of the properties desired. An advantage of this invention is that because of the high boiling electrolyte used herein it is not necessary to use high forming voltages to achieve a hydration resistant barrier oxide—the amount of crystalline oxide formed being proportional to both the forming voltage and the temperature of the electrolyte.

A formation electrolyte composed of 69% ethylene glycol, 1% water and 10% ammonium pentaborate and having a conductivity of 500–1000 ohm-cm. was heated over a range of temperatures, and aluminum electrodes were treated for a total of ten minutes at a forming voltage of 50 v. at each temperature and a current density of 1 milliamp/cm. The electrodes were then treated with boiling water for two minutes. Films formed at various temperatures increased their stability with an increase in forming temperature, as shown in the following table.

| Formation temperature, °C.: | Percent of film destroyed |
|---|---|
| 25 | 60 |
| 140 | 19 |
| 185 | 1.3 |

Further experimentation showed that an electrolyte containing only 10% ammonium pentaborate plus 0.1% ammonium dihydrogen phosphate affords the anodic film formed therein even greater protection when used at a temperature in excess of 150° C. It is quite apparent that the water-resistant crystalline oxide film forms more rapidly and more stably at the higher temperatures.

Since many modifications and variations of the present invention are possible in light of the above teachings without departing from the nature and spirit of the invention, it is to be understood that the invention is not limited to said details except as set forth in the appended claims.

What is claimed is:
1. A method of forming an hydration-resistant anodic oxide of crystalline gamma alumina on an aluminum electrode comprising:
preparing a liquid formation electrolyte having a boiling point in excess of 150° C. and a low viscosity at the formation temperature consisting essentially of a major portion of a high boiling organic liquid solvent of at least one member selected from ethylene glycol, N-methyl propionamide, dimethyl acetamide, dimethyl sulfoxide, iso-octanol, and glycerol, 0.1% to 10.0% of water, and a solute of at least one member selected from phosphates, borates, tartrates, citrates, lactates, acetates, benzoates and salicylates, thereby imparting a conductivity of 500 to 1000 ohm-cm. to said electrolyte at the formation temperature; and
anodically treating an aluminum electrode in said electrolyte at a temperature in excess of 150° C. and at a positive DC forming voltage of up to 200 v.

2. The method of claim 1 wherein said electrolyte has a boiling point of at least 185° C.

3. The method of claim 2 wherein said electrolyte contains from 0.1% to 1.0% of ammonium dihydrogen phosphate.

4. A method of forming an anodic oxide of crystalline gamma alumina on an aluminum electrode comprising:
preparing a formation electrolyte having a boiling point of approximately 185° C. consisting essentially of a solvent of 69% ethylene glycol and 1% water, and a solute of about 30% ammonium pentaborate and 0.1% ammonium dihydrogen phosphate, said electrolyte having a conductivity of 500–1000 ohm-cm.; and
anodically treating an aluminum electrode in said electrolyte at a temperature of 185° C. and at a positive DC forming voltage of 50 v.

References Cited
UNITED STATES PATENTS
3,087,872   4/1963   Bernard _____ 204—58

JOHN H. MACK, Primary Examiner
R. L. ANDREWS, Assistant Examiner